United States Patent
Biskup

[19]

[11] Patent Number: 6,017,074
[45] Date of Patent: Jan. 25, 2000

[54] REMOVABLE LINER FOR CARGO AREA

[76] Inventor: Edward J. Biskup, 32867 Robinhood Dr., Franklin, Mich. 48025

[21] Appl. No.: 09/136,549

[22] Filed: Aug. 19, 1998

Related U.S. Application Data

[60] Provisional application No. 60/056,800, Aug. 25, 1997.

[51] Int. Cl.[7] ............................................. B60R 13/01
[52] U.S. Cl. ........................................ 296/39.1; 296/39.2
[58] Field of Search ............................... 296/39.1, 39.2, 296/39.3

[56] References Cited

U.S. PATENT DOCUMENTS

| | | | |
|---|---|---|---|
| 1,251,865 | 1/1918 | Colvin | 296/39.3 |
| 2,898,146 | 8/1959 | Yudenfreund | 296/39.1 |
| 4,279,439 | 7/1981 | Cantieri | 296/39.2 |
| 4,877,281 | 10/1989 | Altmann | 296/39.1 |
| 4,917,431 | 4/1990 | MaDonald | 296/39.3 |
| 4,979,772 | 12/1990 | Carey et al. | 296/39.1 |
| 5,083,831 | 1/1992 | Foyen | 296/39.1 |
| 5,215,345 | 6/1993 | Orphan | 296/39.1 |
| 5,322,335 | 6/1994 | Niemi | 296/39.1 |
| 5,372,396 | 12/1994 | Van Nahmen | 296/39.2 |
| 5,509,715 | 4/1996 | Scharpf | 296/181 |
| 5,570,921 | 11/1996 | Brooker | 296/39.1 |
| 5,597,193 | 1/1997 | Conner | 296/39.2 |
| 5,695,235 | 12/1997 | Martindale et al. | 296/39.2 |
| 5,722,710 | 3/1998 | Falciani | 296/39.1 |
| 5,755,481 | 5/1998 | Emery | 296/39.2 |
| 5,806,909 | 9/1998 | Wise | 296/39.2 |

FOREIGN PATENT DOCUMENTS

| | | | |
|---|---|---|---|
| 2525492 | 12/1976 | Germany | 296/39.1 |
| 3839260 | 5/1990 | Germany | 296/39.1 |
| 004303054 | 8/1993 | Germany | 296/39.1 |
| 403213442 | 9/1991 | Japan | 296/39.3 |
| 2118109A | 2/1982 | United Kingdom | 296/39.1 |

*Primary Examiner*—Joseph D. Pape
*Assistant Examiner*—Kiran Patel

[57] ABSTRACT

A cargo liner for a minivan type vehicle that is formed of at least two parts which can interconnected and in which one of the parts of the liner is foldable relative to the other part for easy installation onto the floor of the vehicle and for easy storage after use.

11 Claims, 4 Drawing Sheets

REMOVABLE LINER FOR CARGO AREA

TECHNICAL FIELD

This patent application is based on Provisional application No. 60/056,800 filed on Aug. 25, 1997.

The invention concerns cargo liners and more particularly relates to a cargo liner specifically designed for use in a minivan for protecting the carpet from damage when the seats are removed from the vehicle and the latter is used for hauling various types of cargo.

BACKGROUND OF THE INVENTION

Minivans presently being manufactured and sold by automobile manufactures are intended for multi-purpose use including the conveying of passengers as well as for hauling cargo when the seats behind the driver are removed. Inasmuch as the primary use for a minivan is for transporting passengers from one location to another, the minivan is equipped with relatively luxurious carpeting of a type normally provided in a standard passenger vehicle. As a result, when the seats are removed and the minivan is used for carrying cargo, serious damage can occur to the carpeting particularly if heavy articles such as furniture or appliances are slid or moved along the carpet. Even if the articles are not of great weight, they may be of a type which could cause the carpet to be stained or covered with grime, grease, or dirt.

SUMMARY OF THE INVENTION

Accordingly, it is an object of the present invention to provide a new and improved liner for a minivan type vehicle that is of relatively light weight and can be readily installed into the vehicle by one person for protecting the carpeting within the vehicle.

Another object of the present invention is to provide a new and improved liner for a vehicle characterized in that the liner is formed of at least two parts for easy installation and storage and serves to protect the vehicle carpeting from being damaged or soiled.

A further object of the present invention is to provide a new and improved cargo liner for a minivan type vehicle that is formed in at least two parts which are interconnected and in which one of the parts of the liner is foldable relative to the other part for easy installation onto the floor of the vehicle and for easy storage after use.

A still further object of the present invention is to provide a new and improved cargo liner for a vehicle that is foldable for easy installation and storage and includes a portion that can be gripped by hand for readily moving the liner from one location to another.

A still further object of the present invention is to provide a new and improved cargo liner for a vehicle that can be positioned onto a seat mountable floor having connectors for the seats of the vehicle and that includes openings which expose the connectors and allow the seats to be fastened to the connectors.

A still further object of the present invention is to provide a new and improved liner for a vehicle floor which supports removable seats and in which the liner is made of at least two hinged parts made of a plastic material and which are foldable one onto the other and permit the liner to be readily installed onto the vehicle floor once the seats are removed.

A still further object of the present invention is to provide a new and improved liner for a vehicle floor that includes a pair of elongated side-by-side panels which can be placed on the vehicle floor and which conform to the configuration of the adjacent side wall of the vehicle so as to provide a flat uninterrupted surface onto which cargo can be supported.

A still further object of the present invention is to provide a new and improved cargo liner which includes at least a pair of collapsible panels made of a plastic material and that are interconnected along their lengths by a living hinge which is integral with the panels.

A still further object of the present invention is to provide a new and improved cargo liner which includes a pair of panels that fold relative to each other and are interconnected by hinge means spaced along the length of the panels.

The above objects and others are realized in accordance with the present invention by a liner which is adapted to be located in a minivan type motor type behind a side-by side driver's seat and passenger seat. The liner is intended to be placed in the area of the vehicle normally occupied by a plurality of additional passenger seats which are removably mounted to the floor of the vehicle. Stated broadly, the liner includes a pair of elongated side-by-side panels each of which has an outer side edge and an inner side edge extending along the length of the associated panel. The liner is adapted to be positioned onto the vehicle floor so that the inner edges of the panels are located in close proximity to each other while the outer edges of the panels are located adjacent the opposed side walls of the vehicle so as to provide a flat planar uninterrupted surface on which cargo can be supported.

In the preferred form of the invention, the panels are made of a plastic material and have their inner edges interconnected by a living hinge. In a modified form of the invention, the inner edges are interconnected by hinges which are spaced along the length of the panels. In a further modified form of the invention, the inner edges are connected together by an elongated strap which extends along the length of the panels. In a still further modified form of the invention, a tongue and groove arrangement provides the connection between the panels. In vehicles having one or more rear wheel well housings protruding into the cargo area, the outer edge of the panels is provided with a cut-out portion that corresponds in shape to the wheel well housing. In such case, the inner edges of the panels can be butted together and not interconnected as indicated above and, instead, could rely on the interconnection between the cut-out portion and the wheel well shield to prevent the liner from shifting in position relative to the vehicle floor.

When the panels are interconnected at their inner edges, each panel can be folded onto the other panel for ease in installation on the vehicle floor. The foldabilty of the panels also permits the liner to be readily removed from the vehicle and placed into storage. In order to facilitate the moving of the liner from one location to another, a built-in handle can be provided in each of the panels so that, once the liner is in the folded mode, the handle portion in each panel registers with the other to provide a means for manually transporting the liner. In addition, if desired, openings can be provided in the panels that register with the seat connectors secured the vehicle floor so that the seats can be remounted in their usual positions without having to remove the liner.

BRIEF DESCRIPTION OF THE DRAWINGS

Other objects, advantages, and features of the present invention will be more apparent from the following detailed description when taken with the drawings in which.

DETAILED DESCRIPTION OF THE INVENTION

Figure 1:
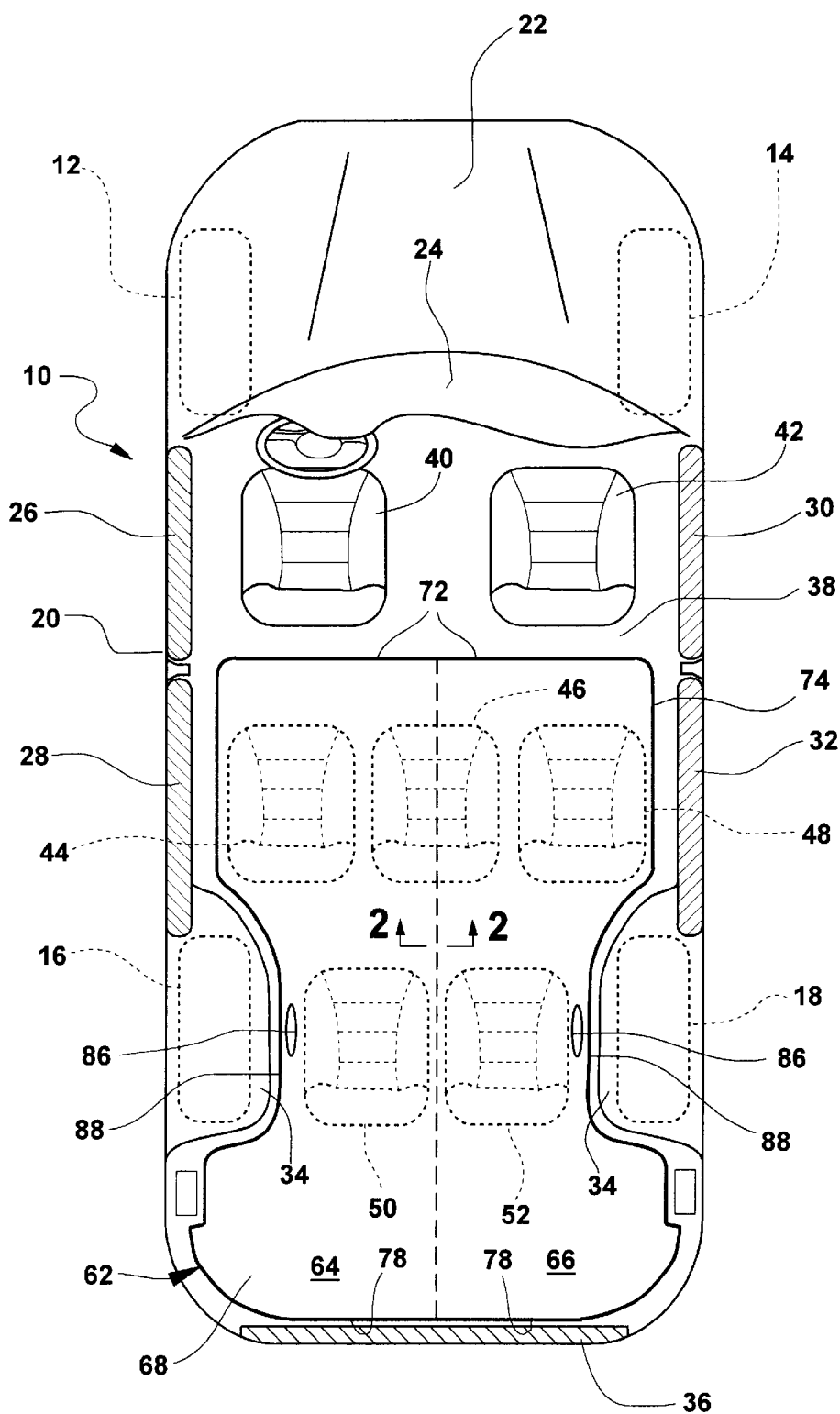
FIG. 1 is a plan view of a motor vehicle minivan with parts broken away so as to show the cargo and passenger areas of the minivan with the former being provided with a liner made in accordance with the present invention.
Figure 2:
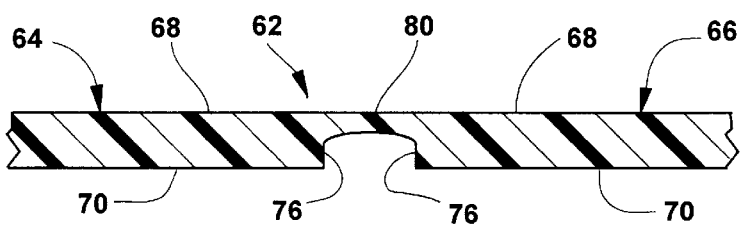
FIG. 2 is an enlarged sectional view taken on line 2—2 of FIG. 1 showing one form of interconnection between the panels of the liner.

Referring to the drawings and more particularly FIGS. 1 and 2 thereof, a motor vehicle 10 of the minivan type is shown having its chassis supported at its front end by a pair of steerable wheels 12 and 14 and at its rear end by a pair of rear wheels 16 and 18. The chassis supports a sheet metal vehicle body 20 which, in this case, is shown having a hood 22 covering the engine compartment (not shown), a glass windshield 24, and a driver's door 26 and a passenger door 28 on one side of the body 20 and a pair of passenger doors 30 and 32 on the other side. To the rear of each of the passenger doors 28 and 32, the inner sheet metal of the body 20 defines a rear wheel housing 34 which serves as an inner side wall on each side of the vehicle 10. The rear end of the vehicle 10 is normally closed by a tailgate 36 which, when opened, allows cargo to be placed within the vehicle 10 as will be more fully explained below.

As is typical with vehicles of this type, the inner passenger compartment includes a carpeted sheet metal floor 38 supporting a permanently positioned bucket seat 40 for the vehicle driver and a permanently positioned bucket seat 42 along side the driver's seat 40 for a front passenger. As seen in phantom lines in FIG. 1, a second row of three bucket seats 44–48 is located to the rear of the driver's seat 40 and the front passenger seat 42, and a third row of two bucket seats 50 and 52 is located to the rear of the bucket seats 44–48. Each of the bucket seats 44–52 in the second and third rows is removably secured to four connectors or keepers 54–60 (seen in FIG. 8) which cooperate with four latches (not shown) mounted on the support frame of the associated seat for locking the seat to the floor 38 of the vehicle 10. The arrangement is such that by manually releasing each of the latches of each seat, the seat can be removed from the van so that the space normally occupied by the seat can be used for transporting articles. Thus, when all of the seats 44–52 in the second and third rows are removed from the vehicle 10, maximum available cargo room is provided which can be used for moving relatively large articles from one location to another. Access to the cargo area is provided through the rear passenger doors 28 and 32 and/or the tailgate 36 when opened.

As alluded to hereinbefore, inasmuch as the minivans presently manufactured are primarily intended for transporting passengers from one location to another, it is common for the floor of the vehicle to be covered with carpeting. As a result, when the seats 44–52 are removed and the van is used for hauling cargo, there is always the chance that the carpeting can be irreparably damaged or soiled. Accordingly, to prevent the carpeting from incurring any permanent damage, a liner 62 according to the present invention is provided which can be placed in the cargo area of the van once the seats 44–52 in the second and third rows are removed.

Figure 3:
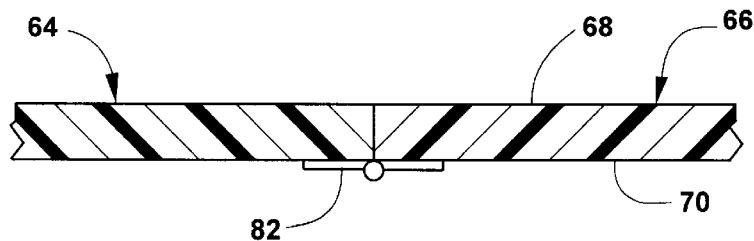
FIG. 3 is a view of a modified form of interconnection between the panels of the liner made according to the invention.
Figure 6:
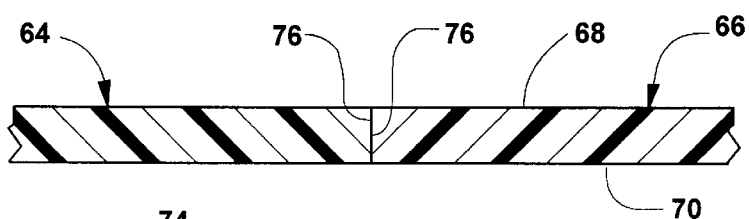
FIG. 6 is a view of the inner edges of the panels of the liner abutting each other without any form of interconnection between the panels.
Figure 7:
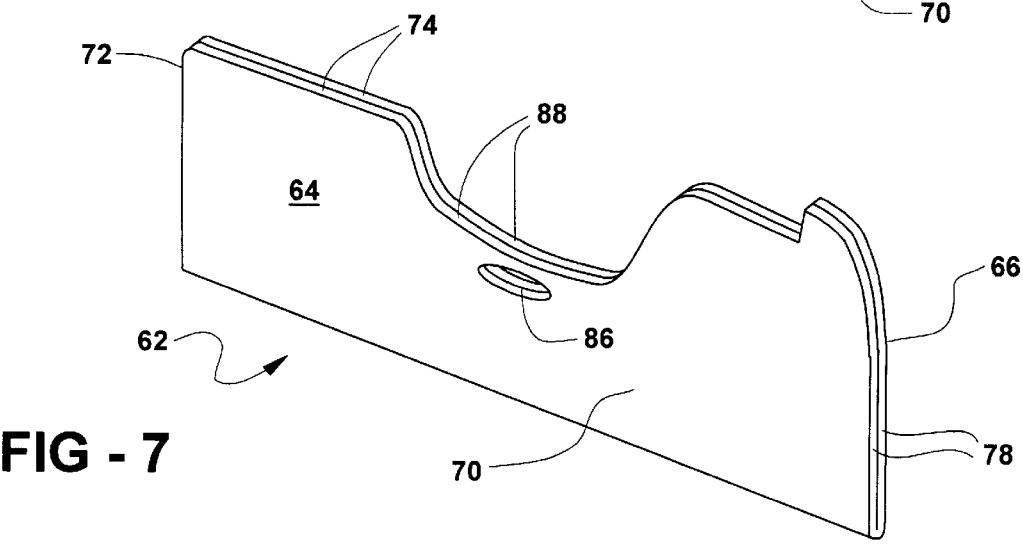
FIG. 7 is a perspective view of the liner of FIGS. 1 and 2 in the folded position.

In this regard and as best seen in FIGS. 1, 2 and 7, the liner 62 includes a pair of generally rectangular panels 64 and 66 each of which is provided with a top flat surface 68 and a parallel bottom flat surface 70. Each of the top and bottom surfaces 68 and 70 is defined or bordered by a front edge 72, an outer side edge 74, an inner side edge 76, and a rear edge 78. The inner side edges 76, 76 of the panels 64 and 66 are preferably straight and are adapted to be interconnected as seen in FIGS. 2–5 or merely abut each other as seen in FIG. 6. For example in FIG. 2, the panels 64 and 66 are shown as being preferably made of a plastic material which will allow cargo to slide readily on their top surfaces when cargo is placed in the van through the openings provided by the rear passenger doors 28 and 32 or the tailgate 36. The panels 64 and 66 are interconnected substantially midway between the outer side edges 74, 74 by a living hinge 80 which is integral with the panels 64 and 66 and serves to interconnect the latter along the entire length of the inner edges. In this manner, any water or other liquid that may be on the cargo being placed on the panels 64 and 66 will not flow onto the covered carpeting. In FIG. 3, the interconnection between the panels is realized through a plurality of spaced and conventional plastic or metallic hinge members 82 (one of which is only shown), while in FIG. 4, the connection is accomplished by an strap 84 that extends the length of the associated inner side edges 76, 76 and is secured to the lower surface 70 of the panels 64 and 66 by an adhesive. As in the case of the living hinge 80, liquid cannot flow through the strap 84 to damage the carpeting.

Figure 4:
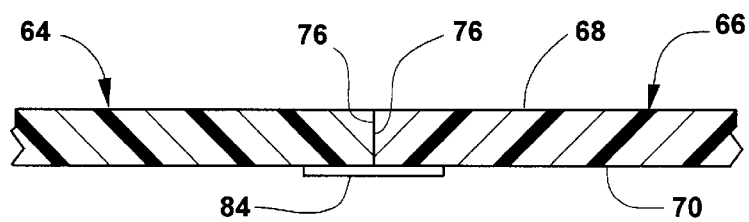
FIG. 4 is a view of another form of interconnection between the panels seen in FIG. 3.

Accordingly, with any of the interconnections provided in FIGS. 2–4, the panels 64 and 66 remain together and each can be folded onto the other so as to provide a compact unit which can be readily moved into and out of the cargo area of the vehicle 10. In this regard, it will be noted that the panels 64 and 66 are each provided with a oblong opening 86 located adjacent the associated wheel housing 34. When the panels 64 and 66 are in the folded position of FIG. 7, the two openings 86, 86 register with each other so as to provide a handle for allowing the liner 62 to be manually carried from a storage area to the vehicle 10 or vice-versa. It will also be noted that each panel 64 and 66 is provided with a cut-out portion 88 along its outer side edge 74. The cut-out portion 88 conforms in configuration with the curvature of the associated wheel housing 34. In a vehicle having wheel housings that protrude into the passenger compartment as shown in FIG. 1, each cut-out portion 88 can cooperate with the associated panel to maintain the latter in position and prevent it from shifting longitudinally. Obviously, when the panels of the liner are interconnected as seen in FIGS. 2–4, only one cut-out portion would be needed to prevent the shifting. In addition, if the vehicle is devoid of any inwardly protruding wheel housing, the liner can be sized so that the front edges 72, 72 of the panels abut the rear of the retaining structure of the seats 40 and 42 and the rear edges 78, 78 of the panels abut the tailgate 36.

Figure 5:
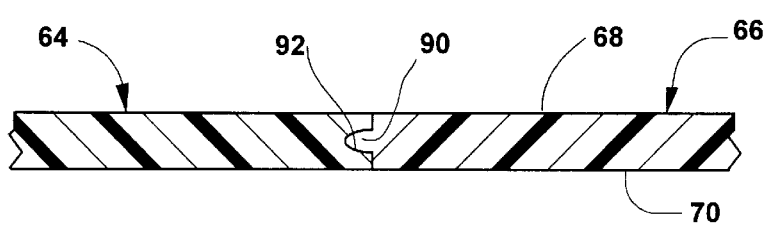
FIG. 5 is a view of still another form of interconnection between the panels seen in FIG. 3.

FIGS. 5 and 6 show the side inner edges 76, 76 of the panels 64 and 66 not being interconnected but merely abutting each other. The arrangement in FIG. 5 has one side inner edge 76 formed with a tongue 90 that extends the length of the associated panel 66 while the other inner edge 76 is formed with a groove 92 which accommodates the tongue 90. If desired, one could place an elastmeric seal within the groove 92 along its entire length so as to provide a sealed connection with the tongue 90 and, as in the case of the hinge connections of FIGS. 2 and 4, prevent liquid from flowing onto the carpeting.

The FIG. 6 arrangement has each inner edge 76 provided with a flat vertically surface which, as shown, is located in a plane perpendicular to the top and bottom surfaces 68 and 70, respectively of the associated panel. When the liner 62 is constructed in this manner, each of the panels 64 and 66 would be independent of the other and would be installed into the vehicle 10 one at a time. Since each of the panels 64 and 66 would be provided with the opening 86 of the type seen in FIGS. 1 and 7, the panels 64 and 66 could be carried as a pair to and from the storage area.

Figure 8:
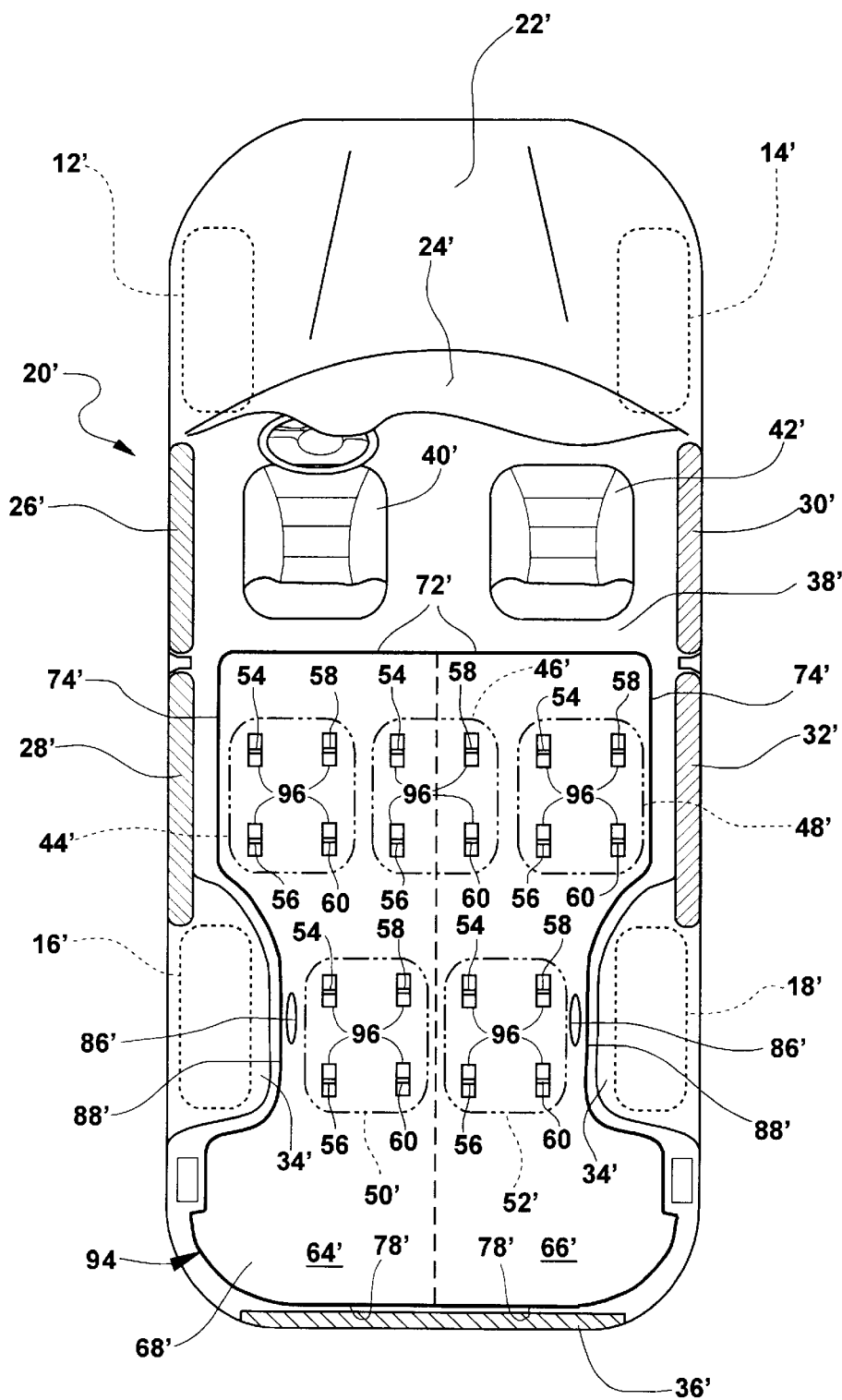
FIG. 8 is a plan view of a minivan vehicle provided with a liner such as seen in FIGS. 1 and 2 and having opening formed therein for exposing the seat connectors for the individual bucket seats.

FIG. 8 shows a modified form of a liner 94 that is the same structurally as the liner 62 seen in FIGS. 1 and 2 and is located in the same type of minivan. Accordingly, all parts of the liner 94 that are identical to the parts of liner 62 and all parts of the vehicle that are identical to the vehicle 10 are identified by the same reference numerals but primed.

It will be noted that the only difference in the liner 94 over the liner 62 is that the former is provided with a plurality of openings 96 which are in alignment with the connectors 54–60 mentioned above for holding the seats 44'–52' to the vehicle floor 38'. By having the connectors 54–60 accessible while the liner 94 is in the vehicle, one need not remove the liner if it should be necessary to have one or more of the second and third row seats 44'–52' available for one or more passengers. If desired, the openings 96 not used can be filled with removable plugs of a type that are pressed into the opening and retained therein by friction. Plugs of this type are well known to those skilled in the art and therefore need not be shown or illustrated in detail.

Figure 9:
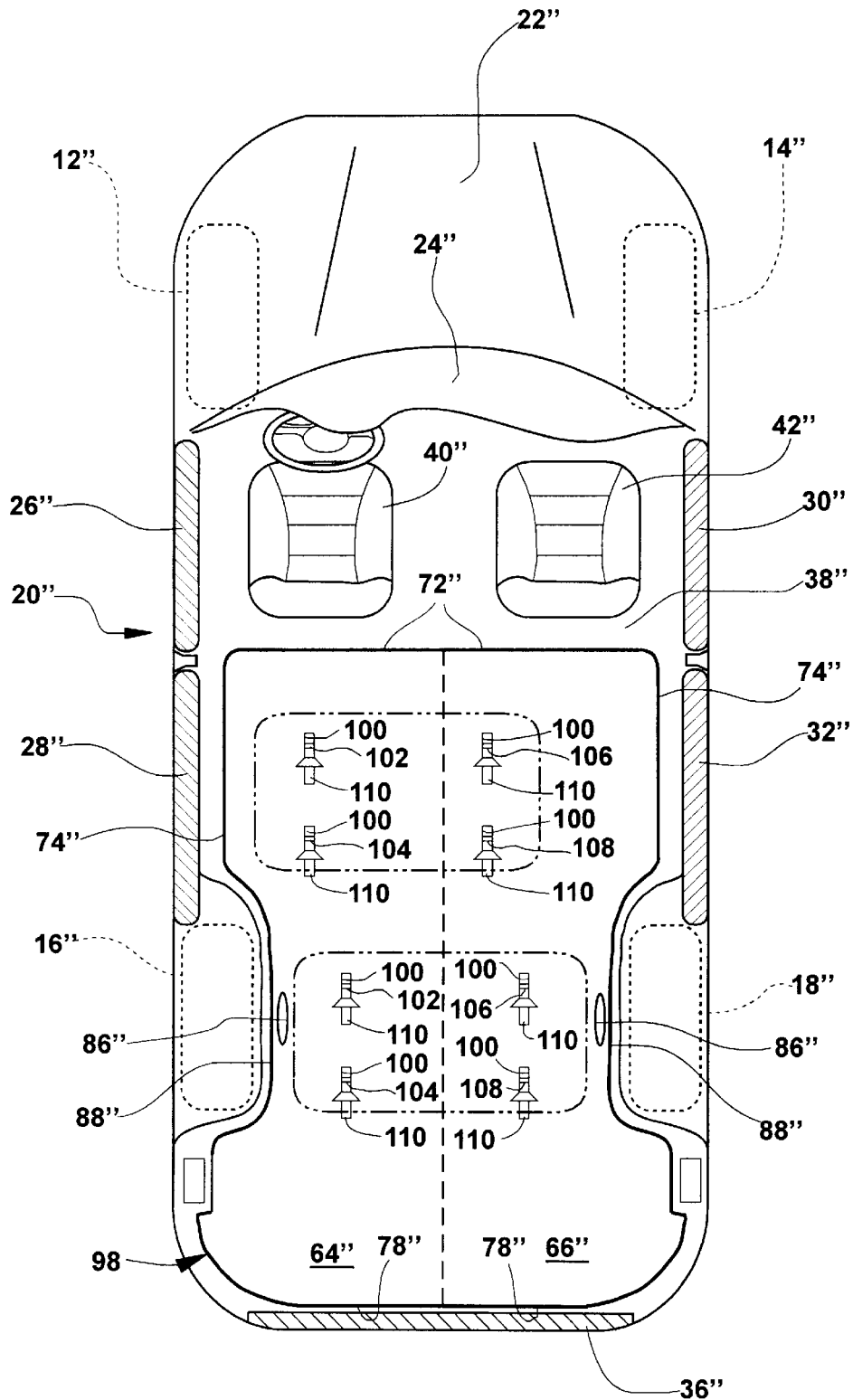
FIG. 9 is a view similar to that of FIG. 8 showing a minivan provided with a liner as seen in FIGS. 1 and 2 and having opening formed therein for exposing the seat connectors for bench type seats.

FIG. 9 shows a further modified form of a liner 98 that is the same structurally as the liner 62 seen in FIGS. 1 and 2 except for having openings 100 provided therein which are aligned with the four connectors or keepers 102–108 normally associated with the latches of a bench seat. The intent here is to have the liner 98 not only provided with the opening 100 for exposing the connectors 102–108 for the latches attached to the bench seat; but also have the opening 100 combined (where needed) with a channel 110 in the top surface of the liner that serves to guide the wheels (not shown) normally a part of such bench seats. As is well known the wheels serve to guide the seat so that the latch drops into the secured position with the connector and is properly located in the vehicle. As is the case of the liner 94 seen in FIG. 8, the parts of the liner 98 and of the vehicle that are identical to the parts of the liner 62 and the vehicle 10 of FIG. 1, are identified by the same reference numerals but double primed.

In the preferred form, the liners seen FIGS. 1, 8, and 9 would be made of a plastic material. It is intended that the liner would be molded as a one piece part having the two panels interconnect by the living hinge as seen in FIG. 2. The plastic material can be of the type that would provide a relatively hard surface that resists being scuffed when heavy articles are slid along the top surface while, at the same time, allowing the provision of a living hinge for interconnecting the two panels. In the case of the liner arrangements seen in FIGS. 3–5, the individual panels can also be made of a plastic material and interconnected in the manner shown and described hereinbefore. Obviously, the panels of FIGS. 3–5 could be made of another material such as plywood, fiber board, or the like and provide the same benefits insofar as protecting the carpeting on the vehicle floor.

Various changes and modifications can be made to the above-described liners without departing from the spirit of the invention. Such changes and modifications are contemplated by the inventor and he does not wish to be limited except by the scope of the appended claims.

The embodiments of the invention in which an exclusive property or privilege is claimed are defined as follows:

1. In a minivan motor vehicle having a driver's seat and a first passenger's seat located adjacent said driver's seat and having a cargo carrying area provided with additional passenger seats removably mounted to a horizontal floor portion of the vehicle located to the rear of said drivers seat and said first passenger's seat, said minivan motor vehicle including a tailgate at its rear end and a pair of laterally spaced side walls, said cargo carrying area being covered by a carpet and being bordered by said pair of laterally spaced side walls and said tailgate of said vehicle and the rear of said driver's and first passenger's seats, a removable liner adapted to cover said carpet in said cargo carrying area so as to protect said carpet from being soiled or damaged when said additional passenger seats are removed from said cargo carrying area, said removable liner including a pair of elongated side-by-side horizontally aligned and rigid panels each of which extends longitudinally of the vehicle the full length of said cargo carrying area and has an outer side edge and an inner side edge extending along the length of the associated panel, said liner being positioned onto said carpet of said cargo carrying area so that the inner side edge of each of said panels extends longitudinally of said vehicle and is located in close proximity to the inner side edge of the adjacent panel while the outer edge of each of said pair of panels conforms in configuration to the adjacent side wall of said vehicle so as to provide a flat planar uninterrupted surface onto which cargo can be supported.

2. The minivan motor vehicle of claim 1 wherein said inner edges of said panels are interconnected with each other by a tongue and groove connection.

3. In a minivan motor vehicle having a driver's seat and a first passenger's seat located adjacent said driver's seat and having a cargo carrying area provided with additional passenger seats removably mounted to a horizontal floor portion of the vehicle located to the rear of said drivers seat and said first passenger's seat, said minivan motor vehicle including a tailgate at its rear end and a pair of laterally spaced side walls, said cargo carrying area being covered by a carpet and being bordered by said pair of laterally spaced side walls and said tailgate of said vehicle and the rear of said driver's and first passenger's seats, a removable liner adapted to cover said carpet in said cargo carrying area so as to protect said carpet from being soiled or damaged when said additional passenger seats are removed from said cargo carrying area, said removable liner including a pair of elongated side-by-side horizontally aligned rigid panels each of which extends longitudinally of the vehicle the full length of said cargo carrying area and has an outer side edge and an inner side edge extending along the length of the associated panel, hinge means having a pivot axis extending longitudinally of the vehicle and interconnecting said panels along their inner edges, said liner being positioned onto said carpet of said cargo carrying area so that the outer edge of each of said pair of panels conforms in configuration to the adjacent side wall of said vehicle so as to provide a flat planar uninterrupted surface onto which cargo can be supported, the arrangement being such that one of said pair of panels is foldable about said hinge means onto the other of said panels so as to facilitate the installation and removal of said liner to and from said cargo carrying area.

4. The minivan motor vehicle of claim 3 wherein said liner is made of a plastic material and said hinge means takes the form of a living hinge integral with said panels.

5. The minivan motor vehicle of claim 3 wherein said hinge means includes a plurality of spaced individual hinges for interconnecting said panels of said liner.

6. The minivan motor vehicle of claim 3 wherein said hinge means takes the form of a strap for interconnecting said panels of said liner.

7. A removable liner for a minivan motor vehicle having a driver's seat and a first passenger's seat located adjacent said driver's seat and having a cargo carrying area provided with additional passenger seats removably mounted to a horizontal floor portion of the vehicle located to the rear of said drivers seat and said first passenger's seat, said minivan motor vehicle including a tailgate at its rear end and a pair of laterally spaced side walls, said cargo carrying area being covered by a carpet and being bordered by said pair of laterally spaced side walls and said tailgate of said vehicle and the rear of said driver's and first passenger's seats, said removable liner adapted to cover said carpet in said cargo carrying area so as to protect said carpet from being soiled or damaged when said additional passenger seats are removed from said cargo carrying area, said removable liner including a pair of generally rectangular elongated side-by-side horizontally aligned and rigid panels each of which extends longitudinally of the vehicle the full length of said cargo carrying area and has an outer side edge and an inner side edge extending along the length of the associated panel, hinge means having a pivot axis extending longitudinally of the vehicle for interconnecting said panels along their inner edges substantially midway between said outer edges of said liner, said liner adapted to be positioned onto said carpet of said cargo carrying area so that the outer edge of each of said pair of panels conforms in configuration to the adjacent side wall of said vehicle and whereby a flat planar uninterrupted surface onto which cargo can be supported is provided, the arrangement being such that one of said pair of panels is foldable about said hinge means onto the other of said panels so as to facilitate the installation and removal of said liner to and from said cargo carrying area.

8. The removable liner of claim 7 wherein said liner is provided with a handle so as to facilitate the movement of said liner to and from said cargo carrying area.

9. The removable liner of claim 7 wherein each of said panels of said liner is formed with an opening so when the panels are folded onto each other said opening in one of said pair of panels registers with said opening in the other of said pair of panels so that a handle is provided for moving the liner to and from the cargo carrying area.

10. The removable liner of claim 7 wherein said floor portion of said vehicle is provided with connectors and said additional passenger seats are provided with laches and wherein each of said panels are provided with openings which register with said connectors in said floor portion that serve as keepers for said latches secured to the additional seats.

11. The removable liner of claim 10 wherein a channel is provided adjacent each of said openings for facilitating the movement of each of said additional seats into a position where said latches can drop into engagement with said connectors.

* * * * *